(12) United States Patent
Kashiwazaki et al.

(10) Patent No.: US 11,442,225 B2
(45) Date of Patent: Sep. 13, 2022

(54) WAVELENGTH CONVERSION ELEMENT AND METHOD FOR MANUFACTURING WAVELENGTH CONVERSION ELEMENT

(71) Applicant: Nippon Telegraph and Telephone Corporation, Tokyo (JP)

(72) Inventors: Takahiro Kashiwazaki, Musashino (JP); Ryoichi Kasahara, Musashino (JP); Osamu Tadanaga, Musashino (JP); Takeshi Umeki, Musashino (JP); Koji Embutsu, Musashino (JP); Takushi Kazama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/054,091

(22) PCT Filed: Apr. 18, 2019

(86) PCT No.: PCT/JP2019/016594
§ 371 (c)(1),
(2) Date: Nov. 9, 2020

(87) PCT Pub. No.: WO2019/216154
PCT Pub. Date: Nov. 14, 2019

(65) Prior Publication Data
US 2021/0223471 A1    Jul. 22, 2021

(30) Foreign Application Priority Data
May 11, 2018    (JP) .............................. JP2018-092430

(51) Int. Cl.
*G02B 6/12*    (2006.01)
*G02B 6/122*    (2006.01)
(Continued)

(52) U.S. Cl.
CPC ............... *G02B 6/122* (2013.01); *G02B 6/13* (2013.01); *G02F 1/377* (2013.01); *G02B 2006/1204* (2013.01)

(58) Field of Classification Search
None
See application file for complete search history.

(56) References Cited

U.S. PATENT DOCUMENTS 6,374,013 B1 * 4/2002 Whiteaway ........ G02B 6/12011
385/140
7,065,035 B1    6/2006 Mizuuchi et al.
(Continued)

FOREIGN PATENT DOCUMENTS

JP    2001-194695 A    7/2001
JP    2009-237325 A    10/2009

OTHER PUBLICATIONS

J. Leuthold et al. Nonlinear silicon photonics. Nature Photonics, vol. 4, Aug. 2010, pp. 535-544. (Year: 2010).*
(Continued)

*Primary Examiner* — Michael Stahl
(74) *Attorney, Agent, or Firm* — Workman Nydegger

(57) ABSTRACT

With a wavelength conversion device based on a nonlinear optical effect, when arrayed waveguides including an intended nonlinear waveguide are fabricated, unwanted slab waveguides are inevitably formed. The slab waveguides can cause an erroneous measurement in the selection of a waveguide having desired characteristics from the arrayed waveguides. The erroneous measurement can lead to redoing steps for fabricating the wavelength conversion device and a decrease in the yield and inhibit the evaluation of the characteristics in selection of the waveguide and the subsequent fabrication of the wavelength conversion device from being efficiently performed. A wavelength conversion device according to the present invention includes a plurality (Continued)

of waveguides formed on a substrate, and a plurality of slab waveguides that are arranged substantially in parallel with and spaced apart from the plurality of waveguides, and a guided light attenuator is formed in each of the slab waveguides. The guided light attenuators allow efficient selection of a waveguide having desired optical characteristics from the plurality of waveguides. The light attenuation by the guided light attenuators can be changed in steps for fabricating the wavelength conversion device.

14 Claims, 11 Drawing Sheets

(51) Int. Cl.
*G02B 6/13* (2006.01)
*G02F 1/377* (2006.01)

(56) References Cited

U.S. PATENT DOCUMENTS

| | | | | |
|---|---|---|---|---|
| 2001/0055453 | A1* | 12/2001 | Mizuuchi | G02F 1/3775 385/122 |
| 2005/0191055 | A1* | 9/2005 | Maruyama | G02B 6/12019 398/45 |
| 2006/0109542 | A1* | 5/2006 | Mizuuchi | G02F 1/3775 359/330 |
| 2007/0237481 | A1* | 10/2007 | Yoshino | G02F 1/377 385/129 |
| 2008/0085089 | A1* | 4/2008 | Catching | G02F 1/377 385/130 |
| 2018/0164612 | A1* | 6/2018 | Kondou | G02B 6/122 |
| 2022/0019125 | A1* | 1/2022 | Kazama | G02F 1/377 |

OTHER PUBLICATIONS

English translation of written opinion in PCT/JP2019/016594, dated May 28, 2019. (Year: 2019).*

International Search Report dated May 28, 2019, issued in PCT Application No. PCT/JP2019/016594, filed Apr. 18, 2019.

Y. Nishida et al., *Direct-Bonded QPM-LN Ridge Waveguide with High Damage Resistance at Room Temperature*, Electronics Letters, Vo. 39, No. 7, 2003, pp. 609-611.

Takeshi Umeki et al., *Highly Efficient Wavelength Converter Using Direct-Bonded PPZnLN Ridge Waveguide*, IEEE Journal of Quantum Electronics, vol. 46, No. 8, 2010, pp. 1206-1213.

T. Kazama et al., *Low-Parametric-Crosstalk Phase-Sensitive Amplifier for Guide-Band-Less DWDM Signal Using PPLN Waveguides*, Journal of Lightwave Technology, vol. 35, No. 4, 2017, pp. 755-761.

* cited by examiner

WAVELENGTH CONVERSION ELEMENT AND METHOD FOR MANUFACTURING WAVELENGTH CONVERSION ELEMENT

TECHNICAL FIELD

The present invention relates to an optical device based on a nonlinear optical effect. More specifically, the present invention relates to a wavelength conversion device used for an optical communication system or optical measurement system, for example.

BACKGROUND ART

Optical application technologies based on nonlinear optical effects are expected to find uses in fields such as optical communication or optical quantum information communication. A known one of basic nonlinear optical effects is wavelength conversion, which converts light incident on a nonlinear optical medium into light of a different frequency. More specifically, a technique is widely known which uses the characteristics of the wavelength conversion to generate light in a wavelength band that is hardly oscillated by a laser by itself. In particular, a periodically poled lithium niobate (PPLN) waveguide made of lithium niobate (LiNbO$_3$), which is a second-order nonlinear material and has a high nonlinear constant, provides a highly efficient nonlinear optical effect and has already been incorporated in commercially available light sources.

The second-order nonlinear optical effect generates light of a new wavelength $\lambda_3$ from input light of wavelengths $\lambda_1$ and $\lambda_2$. The wavelength conversion satisfying the following formula is referred to as sum frequency generation (SFG).

$$1/\lambda_3 = 1/\lambda_1 + 1/\lambda_2 \qquad \text{Formula (1)}$$

If $\lambda_1 = \lambda_2$, the Formula (1) can be transformed into the following formula, and the wavelength conversion satisfying the following formula is referred to as second harmonic generation (SHG).

$$\lambda_3 = \lambda_1/2 \qquad \text{Formula (2)}$$

Furthermore, the wavelength conversion satisfying the following formula is referred to as difference frequency generation (DFG).

$$1/\lambda_3 = 1/\lambda_1 - 1/\lambda_2 \qquad \text{Formula (3)}$$

Furthermore, there is also an optical parametric effect that generates light of the wavelengths $\lambda_2$ and $\lambda_3$ that satisfy the Formula (3) from input light of the wavelength $\lambda_1$. The SHG and SFG wavelength conversions described above generate light of a shorter wavelength, that is, light of a higher energy, from input light and is often used for generation of light in the visible light range, for example.

In order to efficiently achieve the second-order nonlinear optical effect described above, it is necessary that the phase mismatch between the three rays of light of different wavelengths interacting with each other is 0. With the periodically poled waveguide, the poles of the nonlinear optical material can be periodically inverted to achieve a quasi-phase matching. Provided that the inversion period is A, in the sum frequency generation expressed by the Formula (1), the inversion period A can be set to satisfy the following formula with respect to the wavelengths $\lambda_1$, $\lambda_2$ and $\lambda_3$.

$$n_3/\lambda_3 - n_2/\lambda_2 - n_1/\lambda_1 - 1/\Lambda = 0 \qquad \text{Formula (4)}$$

In this formula, $n_1$ denotes the index of refraction at the wavelength $\lambda_1$, $n_2$ denotes the index of refraction at the wavelength $\lambda_2$, and $n_3$ denotes the index of refraction at the wavelength $\lambda_3$.

In addition to using such a periodically poled structure, the region in which the wavelength conversion occurs can be formed as a waveguide to achieve highly efficient wavelength conversion. The nonlinear optical effect grows as the overlapping density of the light that causes the nonlinear interaction increases. Therefore, more efficient wavelength conversion can be achieved by using a waveguide structure, which confines the light in a small cross-sectional area and guides the light over a long distance.

Typical methods for achieving a waveguide structure made of lithium niobate (LN), which is a nonlinear optical crystal, are based on Ti diffusion or proton exchange. Recently, as described in Non-Patent Literature 1, ridge optical waveguides as a wavelength conversion device are being researched and developed. The ridge optical waveguide can directly use the characteristics of the bulk crystal and is characterized by its high optical damage resistance, its long-term reliability and its ease of device designing, for example. The ridge optical waveguide is formed by bonding two substrates to each other, thinning one of the substrates into a thin film and forming ridges in the thinned substrate. A direct bonding technique of firmly bonding the substrates without using an adhesive or the like is known. The directly-bonded ridge waveguide can be used with intense incident light and has been successfully reduced in size of the core thereof owing to the progress of the waveguide forming techniques (Non-Patent Literature 2, for example), and the nonlinear optical efficiency of the directly-bonded ridge waveguide is ever improving.

LN, which is a ferroelectric crystal, is a material that is hard to process, and it is difficult to form an LN structure sized or shaped as designed even if a semiconductor process capable of fine processing is used. In the state of the art, considering also that the nonlinear optical effect in the PPLN waveguide using the quasi-phase matching is sensitive to the structure of the waveguide, it is difficult to fabricate a nonlinear optical waveguide having specific desired nonlinear optical characteristics. For this reason, a plurality of waveguides between which a structure parameter gradually varies is formed on a substrate at the same time in the fabrication of the wavelength conversion device as described later, the optical characteristics of all the waveguides are evaluated, and only the waveguide(s) having desired characteristics is selected and used.

In the shaping of the PPLN waveguide, the dry etching technique is more often used than the wet etching technique. With the wet etching, the etching rate significantly varies in the direction of the polarization of the PPLN, and it is difficult to obtain a desired waveguide structure. After a plurality of waveguides is formed on a bonded substrate, the substrate is cut to form an end face for measurement, and a waveguide having desired characteristics is selected. After that, the device is packaged into a module as a fiber-pigtailed device, for example (Non-Patent Literature 3). When packaging into a module, the selected waveguide is aligned with optical fibers via a lens so that light is efficiently incident on the waveguide and converted light is efficiently emitted from the waveguide. A series of steps for fabricating the wavelength conversion device using the PPLN waveguide described above will be described later with reference to FIG. 2.

CITATION LIST

Non-Patent Literature

Non-Patent Literature 1: Y. Nishida, H. Miyazawa, M. Asobe, O. Tadanaga, and H. Suzuki, "Direct-bonded QPM-LN ridge waveguide with high damage resistance at room temperature," 2003, Electronics Letters, Vol. 39, No. 7, p. 609-611

Non-Patent Literature 2: T. Umeki, O. Tadanaga, and M. Asobe, 'Highly Efficient Wavelength Converter Using Direct-Bonded PPZnLN Ridge Waveguide,' 2010, IEEE Journal of Quantum Electronics, Vol. 46, No. 8, pp. 1206-1213

Non-Patent Literature 3: T. Kazama, T. Umeki, M. Abe, K. Enbutsu, Y. Miyamoto, and H. Takenouchi, "Low-Parametric-Crosstalk Phase-Sensitive Amplifier for Guard-Band-Less DWDM Signal Using PPLN Waveguides," 2017, Journal of Lightwave Technology, Vol. 35, Issue 4, pp. 755-761

SUMMARY OF THE INVENTION

Technical Problem

In the fine processing of a nonlinear optical crystal, there is a known problem that a common chemical dry etching causes generation of a low-volatility substance, which inhibits efficient etching. To avoid the problem, as wide a portion of the part that does not need to be etched as possible needs to be covered with an etching mask, such as a resist, that is an organic protective film. However, such a process using an etching mask inevitably results in the formation of an unwanted slab waveguide outside the desired waveguide structure in steps for fabricating a waveguide.

FIG. 1 is a diagram showing a configuration of a conventional wavelength conversion device using PPLN waveguides. As described above, when fabricating an optical waveguide device using LN, arrayed waveguides between which a waveguide structure parameter gradually varies are fabricated, from the viewpoint that the material is difficult to process and the yield tends to be low. From the plurality of waveguides forming the waveguide array, only the waveguide having the most excellent optical characteristics is selected and used. FIG. 1 is a conceptual diagram showing a wavelength conversion device chip 100 including a plurality of waveguides 101*a* and 101*b* fabricated on a substrate 101.

FIG. 2 is a flow diagram showing a series of steps for fabricating a wavelength conversion device using PPLN waveguides. Referring to a flow 200, first, in Step 202, the plurality of waveguides 101*a* and 101*b* is fabricated on a bonded substrate. The wavelength conversion device chip 100 in FIG. 1 corresponds to the chip including part of the plurality of waveguides fabricated on the substrate that is cut out in Step 203 in the flow diagram of FIG. 2. Once the wavelength conversion device chip 100 shown in FIG. 1 is fabricated, in Step 204 in the flow diagram of FIG. 2, the optical characteristics of each of the plurality of waveguides 101*a* and 101*b* as a wavelength conversion waveguide are measured, and a desired wavelength is selected.

Referring to FIG. 1 again, slab waveguides 102*a*, 102*b* and 102*c* are formed in the portion covered with the etching mask in order to efficiently form the waveguides 101*a* and 101*b* by etching. If there are these slab waveguides, when the optical characteristics of the arrayed waveguides are measured in Step 204 of FIG. 2, the slab waveguides that are not the arrayed waveguides including the desired waveguide finally selected can also be optically aligned on the end face of the chip for the measurement of the optical characteristics. The unwanted slab waveguides formed in addition to the arrayed waveguides pose problems that hinder the efficient waveguide selection and the subsequent manufacture and inspection of the module, such as problems that the measurement is erroneous, that the measurement needs to be redone, and that a wrong waveguide is selected and the chip has to be discarded, in the evaluation of the characteristics of the arrayed waveguides. The problems will be described in more detail below with reference to an actual process.

FIG. 3 are diagrams for conceptually illustrating the step of selecting a desired waveguide from a waveguide array. As shown in FIG. 3(*a*), the wavelength conversion device chip 100 shown in FIG. 1 is typically obtained by fabricating a waveguide array including 100 or more waveguides on the entire face of a directly-bonded wafer 300 (Step 202 in FIG. 2) and cutting chips having areas 301-1 to 301-4 of a predetermined size out of the wafer 300 (Step 203 in FIG. 2). Note that the cutting is performed for the evaluation of the optical characteristics and the waveguide selection in Step 204 in FIG. 2, and the areas 301-1 to 301-4 are larger than the final chip area. In Step 204, one waveguide having the most excellent optical characteristics is selected from a plurality of waveguides between which a structure parameter gradually varies. Therefore, the cutting in a direction (x-axis) perpendicular to the waveguides in FIG. 3(*a*) is performed in minimum units of final wavelength conversion devices. On the other hand, the cutting in a direction (z-axis) parallel with the waveguides in FIG. 3(*a*) is performed in appropriate units of a plurality of final chips by considering the number of the arrayed waveguides included in a group for selection in order that the optical characteristics can be efficiently evaluated.

FIG. 3(*b*) is a diagram for conceptually illustrating a chip 301 cut out for the measurement of the optical characteristics. The chip 301 cut out for the measurement of the optical characteristics intrinsically includes n waveguides 302-1 to 302-*n* having different widths, for example. The number of the waveguides included in the chip 301 may be greater than 100. The optical characteristics of the waveguides are successively measured between one end face 1 and another end face 2. Specifically, one or more kinds of test light 304 are launched from a test light source 303 into the end face 1 via an optical fiber, and the test light or wavelength-converted light 305 output from the end face 2 is measured by a measurement instrument 306. In the optical measurement of the waveguides, instead of measuring the loss of the guided light, the wavelength conversion characteristics may be directly checked by using two or more rays of signal light having different wavelengths.

In practice, in addition to the large number of arrayed waveguides 302-1 to 302-*n* including the waveguide finally selected, the chip 301 cut out shown in FIG. 3(*b*) includes slab waveguides (not shown in FIG. 3) between the arrayed waveguides. The arrayed waveguides that can be selected are waveguides having an extremely small cross-sectional area, such as about several µm square, while the slab waveguides have a far greater width of several tens of µm or more. Therefore, when the optical fiber is brought close to each end face for measuring the optical characteristics, the optical fiber can be readily optically coupled to the large number of slab waveguides, which are not the target of the evaluation of the optical characteristics. Typically, when optically coupling the optical fiber to the chip end face for the evaluation of the optical characteristics, the position of the optical coupling is successively displaced in the direction of arrangement of the arrayed waveguides (x-axis) for the optical measurement. However, the slab waveguides occupy a considerable proportion of the chip end face in the x-axis direction, so that the optical fiber being moved in the x-axis direction can be optically coupled to not only the target waveguides but also the slab waveguides to a similar extent over a wide range. Even if a three-dimensional drive mechanism capable of extremely precise adjustment is used, the optical measurement can be performed at a wrong point. The resulting erroneous measurement of the optical characteristics can lead to an erroneous selection of the waveguide having the best optical characteristics.

If the measurement is erroneous, a waveguide having inappropriate wavelength conversion characteristics, which should not be intrinsically selected, can be selected in Step 204 in FIG. 2. Furthermore, when a chip of the minimum size including a set of arrayed waveguides is cut out in the subsequent Step 205, a chip including an inappropriate waveguide can be formed, or a chip including the optimum waveguide can fail to be selected but be discarded. Furthermore, the measurement of each waveguide shown in FIG. 3 typically takes about 1 minute, so that the measurement of 100 waveguides takes more than 1 hour, for example. If an erroneous optical measurement occurs at the stage of selecting the desired waveguide, it takes a vast amount of time and an additional cost to remedy the error and redo the measurement. The total yield also decreases until the wavelength conversion device module is completed through the series of steps in FIG. 2. For this reason, performing the evaluation of the optical characteristics of the target arrayed waveguides without error in Step 204 in the flow diagram of FIG. 2 is a key to efficiently performing the series of steps for fabricating the wavelength conversion device in FIG. 2. The plurality of unwanted slab waveguides formed between the plurality of intrinsically required waveguides shown in FIG. 1 hinder the evaluation of the characteristics of the waveguides and the subsequent fabrication of the wavelength conversion device from being efficiently performed.

The present invention has been devices in view of such problems, and an object of the present invention is to provide a configuration and a method for more efficiently fabricating a wavelength conversion device incorporating a nonlinear optical device.

Means for Solving the Problem

To attain the object described above, an invention according to claim 1 is a wavelength conversion device, including: a plurality of waveguides formed on a substrate of a nonlinear material; a plurality of slab waveguides that are arranged substantially in parallel with and spaced apart from the plurality of waveguides; and guided light attenuators formed of a material having an index of refraction different from an index of refraction of a material forming the slab waveguide in the plurality of slab waveguides. The plurality of waveguides may be arrayed waveguides between which a waveguide structure parameter gradually varies. The plurality of waveguides may be a periodically poled (PPLN) waveguides made of lithium niobate ($LiNbO_3$), which is a second-order nonlinear material.

An invention according to claim 2 is the wavelength conversion device according to claim 1, wherein the guided light attenuator is formed as an internal region of the slab waveguide on a face of the substrate in which there is not the material forming the slab waveguide.

An invention according to claim 3 is the wavelength conversion device according to claim 1 or 2, wherein on a face of the substrate, the guided light attenuator has a shape that is asymmetrical with respect to a light guide direction in the plurality of slab waveguides.

An invention according to claim 4 is the wavelength conversion device according to any one of claims 1 to 3, wherein the plurality of waveguides and the plurality of slab waveguides are straight waveguides, and a configuration parameter that determines a size of a core of each of the plurality of waveguides gradually varies between the plurality of waveguides.

An invention according to claim 5 is the wavelength conversion device according to any one of claims 1 to 4, wherein the plurality of waveguides is made of $LiNbO_3$ or a material containing $LiNbO_3$ and at least one additive selected from among Mg, Zn, Sc and In.

An invention according to claim 6 is the wavelength conversion device according to any one of claims 1 to 5, wherein the guided light attenuator is a groove formed in the slab waveguide as an internal region thereof by removing the material forming the slab waveguide, and of slab waveguides adjacent to one of the plurality of waveguides, at least the groove formed in the slab waveguide on one side of the one waveguide is filled with a material having an index of refraction greater than 1.

An invention according to claim 7 is a method of fabricating a wavelength conversion device that includes a plurality of waveguides formed on a substrate of a nonlinear material and a plurality of slab waveguides that are arranged substantially in parallel with and spaced apart from the plurality of waveguides, the method including: a step of fabricating a guided light attenuator formed of a material having an index of refraction different from an index of refraction of a material forming the slab waveguides in the plurality of slab waveguides; a step of successively measuring an optical characteristic of the plurality of waveguides and selecting one waveguide having a desired optical characteristic from the plurality of waveguides; and a step of increasing at least the index of refraction of the material forming the guided light attenuator that is formed in the slab waveguide that is located on one side of the selected waveguide and adjacent to the selected waveguide.

Preferably, the guided light attenuator is formed as an internal region of the slab waveguide on a face of the substrate in which there is not the material forming the slab waveguide. Furthermore, on the face of the substrate, the guided light attenuator may have a shape that is asymmetrical with respect to a light guide direction in the plurality of slab waveguides.

An invention according to claim 8 is the method according to claim 7, wherein the guided light attenuator is a groove formed in the slab waveguide as an internal region thereof by removing the material forming the slab waveguide, and the step of increasing the index of refraction of the material forming the guided light attenuator includes: filling the groove with a material having an index of refraction greater than 1.

Effects of the Invention

As described above, according to the present invention, a wavelength conversion device can be efficiently manufactured at low cost.

DESCRIPTION OF EMBODIMENTS

A wavelength conversion device according to the present invention includes a plurality of waveguides fabricated on a substrate and a plurality of slab waveguides that are arranged substantially in parallel with and spaced apart from the plurality of waveguides, and a guided light attenuator is formed in each of the slab waveguides. The guided light attenuators allow efficient selection of a waveguide having desired optical characteristics from the plurality of waveguides. In steps for fabricating the wavelength conversion device, the light attenuation by the guided light attenuator can be changed. When a chip is cut out from the substrate, and a selected waveguide in the chip is optically coupled to an external fiber or the like in a module, the light attenuation by the guided light attenuator can be changed so that the optical coupling can be more easily and efficiently achieved. A method of fabricating the wavelength conversion device is also an aspect of the present invention. In order to efficiently manufacture the wavelength conversion device at low cost, the light attenuation by the guided light attenuator is changed.

First Embodiment

Figure 1:
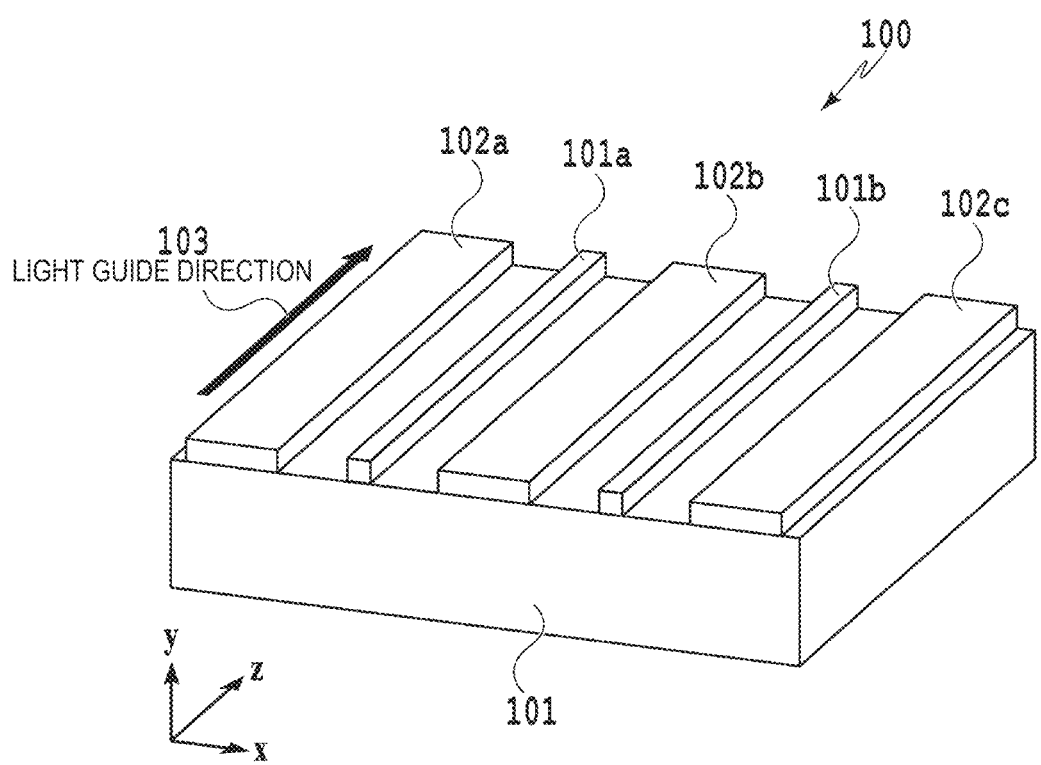
FIG. 1 is a diagram showing a configuration of a conventional wavelength conversion device made of PPLN.
Figure 4:
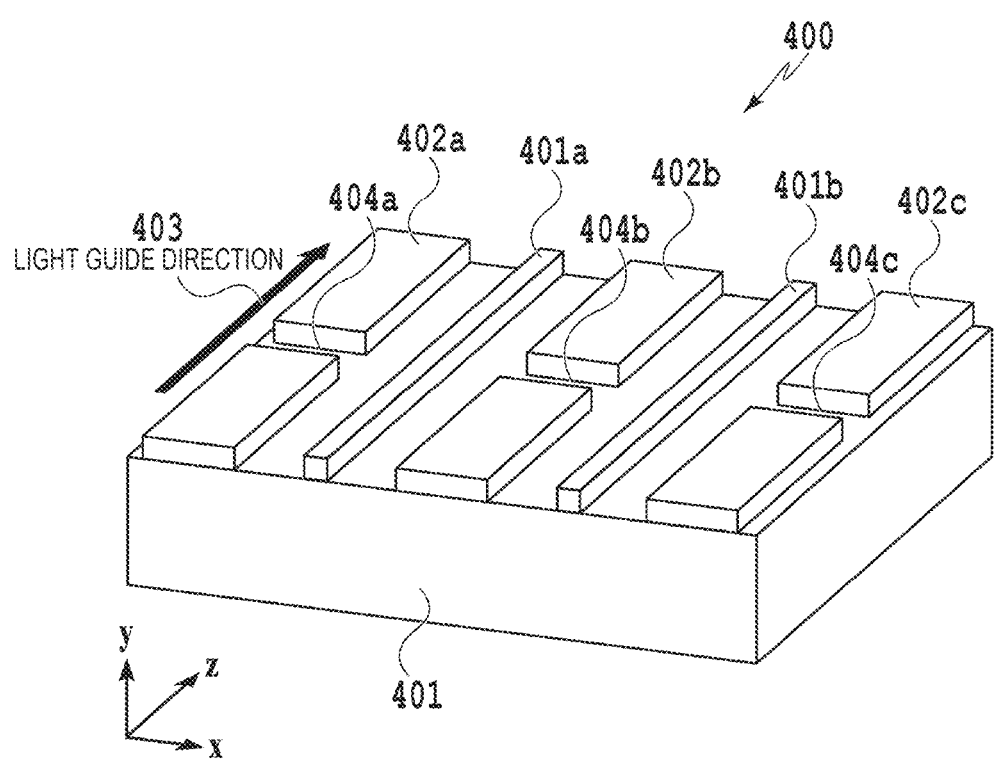
FIG. 4 is a conceptual diagram for illustrating a configuration of a wavelength conversion device according to a first embodiment of the present invention.

FIG. 4 is a conceptual diagram for illustrating a configuration of a wavelength conversion device according to a first embodiment of the present invention. The configuration corresponds to the configuration of the conventional wavelength conversion device shown in FIG. 1. A wavelength conversion device 400 in FIG. 4 is a chip including a plurality of waveguides cut from a substrate in which a large number of waveguides (arrayed waveguides) is formed. The wavelength conversion device 400 includes a plurality of waveguides 401a and 401b and slab waveguides 402a to 402c that are formed substantially in parallel with and spaced apart from the plurality of waveguides. All the waveguides are formed along a z-axis direction, and light can be input to and output from the wavelength conversion device 400 at two end faces (x-y faces) defining the outer shape of the chip of the wavelength conversion device 400 that are perpendicular to the waveguides (z-axis) and oriented in the depth direction of the drawing. Light is guided in each waveguide in the light guide direction (z-axis).

With the wavelength conversion device according to the present invention, a plurality of waveguides between which a configuration parameter gradually varies is formed in one chip, and the most appropriate waveguide can be selected from among the plurality of waveguides. The varying configuration parameter may be a parameter that determines the shape of the waveguide. For example, the waveguide width may gradually vary. Alternatively, the polarization inversion period (quasi-phase matching QPM) pitch) may vary. The most appropriate waveguide can be selected by measuring the propagation loss of each of the plurality of waveguides and selecting the waveguide of the lowest propagation loss, for example. Alternatively, two optical signals of different wavelengths may be input to one of the end faces, the level of the light of converted wavelengths emitted from the other end face may be measured, and the light of the highest wavelength conversion efficiency may be selected. The selection of the most appropriate waveguide can be based on any criterion including the measurement described above. That is, the configuration according to the present invention can be used when fabricating arrayed waveguides and selecting one or more of the waveguides based on some criterion in order to attain an intended functionality.

The slab waveguides 402a to 402c of the wavelength conversion device according to the present invention are formed in a region that is covered with an etching mask when the plurality of waveguides between which a configuration parameter gradually varies described above is efficiently fabricated by fine processing by dry etching. With the wavelength conversion device according to the present invention, slits 404a to 404c, in which there is no core material, are formed in the slab waveguides 402a to 402c, respectively. The light input to one end face of the chip is scattered by the slits 404a to 404c, so that the light attenuates as the light is guided by the slab waveguides 402a to 402c, and the attenuated light is output from the other end face.

In the wavelength conversion device according to the present invention, the plurality of waveguides 401a and 401b and the slab waveguides 402a to 402c adjacent thereto are spaced apart from each other to an extent that the slab waveguides have no influence on the nonlinear waveguides serving as the wavelength conversion device. For example, if the waveguide has a ridge structure in which the plurality of waveguides 401a and 401b are LN cores and there is air on the opposite sides of the cores, the distance between the waveguides can be approximately equal to or greater than the wavelength of the guided light. The interval (period) between the plurality of nonlinear waveguides can be several tens of μm to several hundreds of μm for the wavelength conversion device for optical communication, for example, although the interval can depend on the application.

Figure 2:
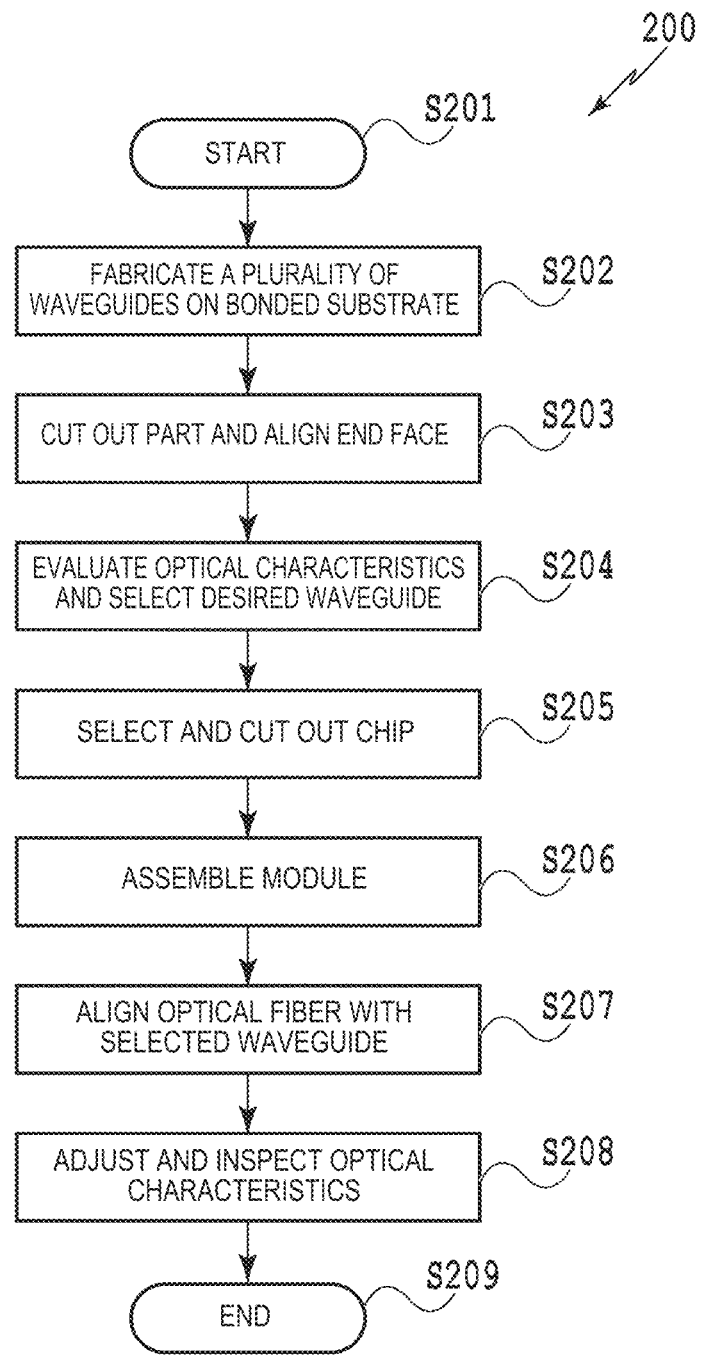
FIG. 2 is a flow diagram for illustrating a fabrication of a wavelength conversion device incorporating PPLN waveguides.
Figure 3:
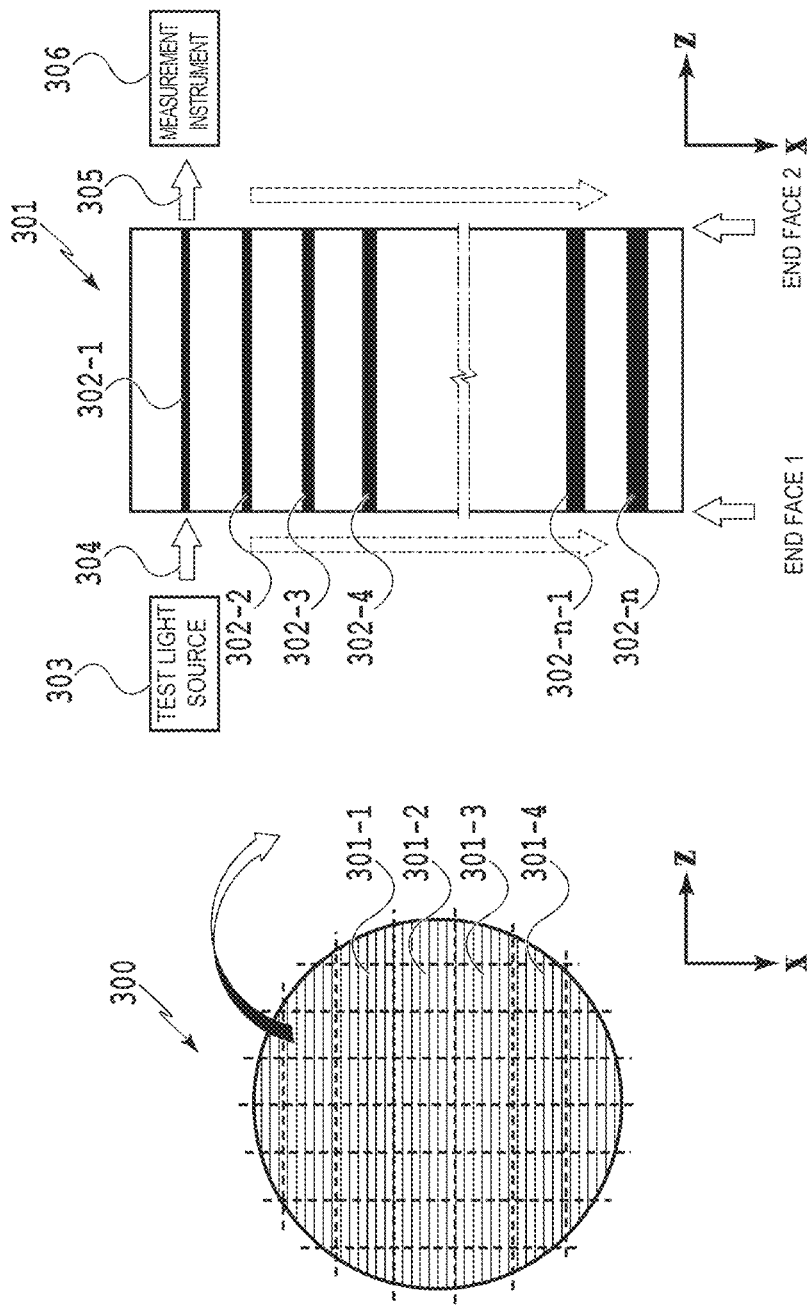
FIG. 3 are diagrams for illustrating a step of selecting a waveguide from a waveguide array.

As described earlier with reference to FIGS. 2 and 3, in the series of steps for fabricating the wavelength conversion device, the plurality of waveguides 401a and 401b and the slab waveguides 402a to 420c are fabricated (Step 202), and as shown in FIG. 3(b), the chip 301 including a large number of waveguides arranged in parallel with each other is cut out (Step 203). Note that the selection from among the waveguides is yet to be made at this point, and the chip is a so-called half-finished chip and includes a large number of waveguides, specifically, several tens to over a hundred of waveguides. In the step (Step 204) of evaluating the optical characteristics and selecting one appropriate waveguide (desired waveguide) from among the large number of waveguides (waveguide array), the optical characteristics are measured by successively displacing the position of coupling to an optical fiber in the x-axis direction on each of the two end faces in FIG. 4 for all the waveguides in FIG. 4. With the conventional configuration, the optical fiber can also be optically coupled to the slab waveguides, which should not be intrinsically selected. Therefore, the measurement in Step 204 in FIG. 2 is erroneous, so that some of the steps for fabricating the wavelength conversion device need to be redone and therefore problems such as a reduction of the efficiency, a reduction of the yield or an increase of the cost arise to make the series of steps for fabricating the wavelength conversion device less feasible.

To the contrary, with the configuration of the wavelength conversion device according to the present invention shown in FIG. 4, even if test light is input to any of the slab waveguides from one end face by mistake, the output light used in the evaluation of the optical characteristics in Step 204 is sufficiently attenuated by the slit 404a to 404c. Therefore, even if the optical characteristics of a slab waveguide are measured by mistake, the abnormality of the measurement can be immediately determined based on the magnitude of the attenuation. When the wrong measurement of a slab waveguide, which should not be measured, is determined, various actions, such as directing the three-dimensional drive mechanism of the measurement apparatus for the optical characteristics to redo the optical coupling or displaying an alarm, can be immediately taken to remedy the error in the step of optical characteristics evaluation and waveguide selection (Step 204). The evaluation of the optical characteristics in Step 204 is typically performed by an automated measurement system, so that various measures can be taken to remedy the detected wrong measurement. In this way, the slits 404a to 404c formed in the slab waveguides 402a to 402c allow the measurement of the optical characteristics for selecting a desired waveguide to be efficiently performed without misalignment.

The slits 404a to 404c in FIG. 4 are formed by air replacing a part of the core material forming the respective slab waveguides, and serves as a guided light attenuator (guided light attenuation structure). The slit scatters the guided light, so that the light is substantially attenuated after being guided beyond the slit. The guided light attenuator can also be implemented in various forms other than the slit shown in FIG. 4.

Figure 5:
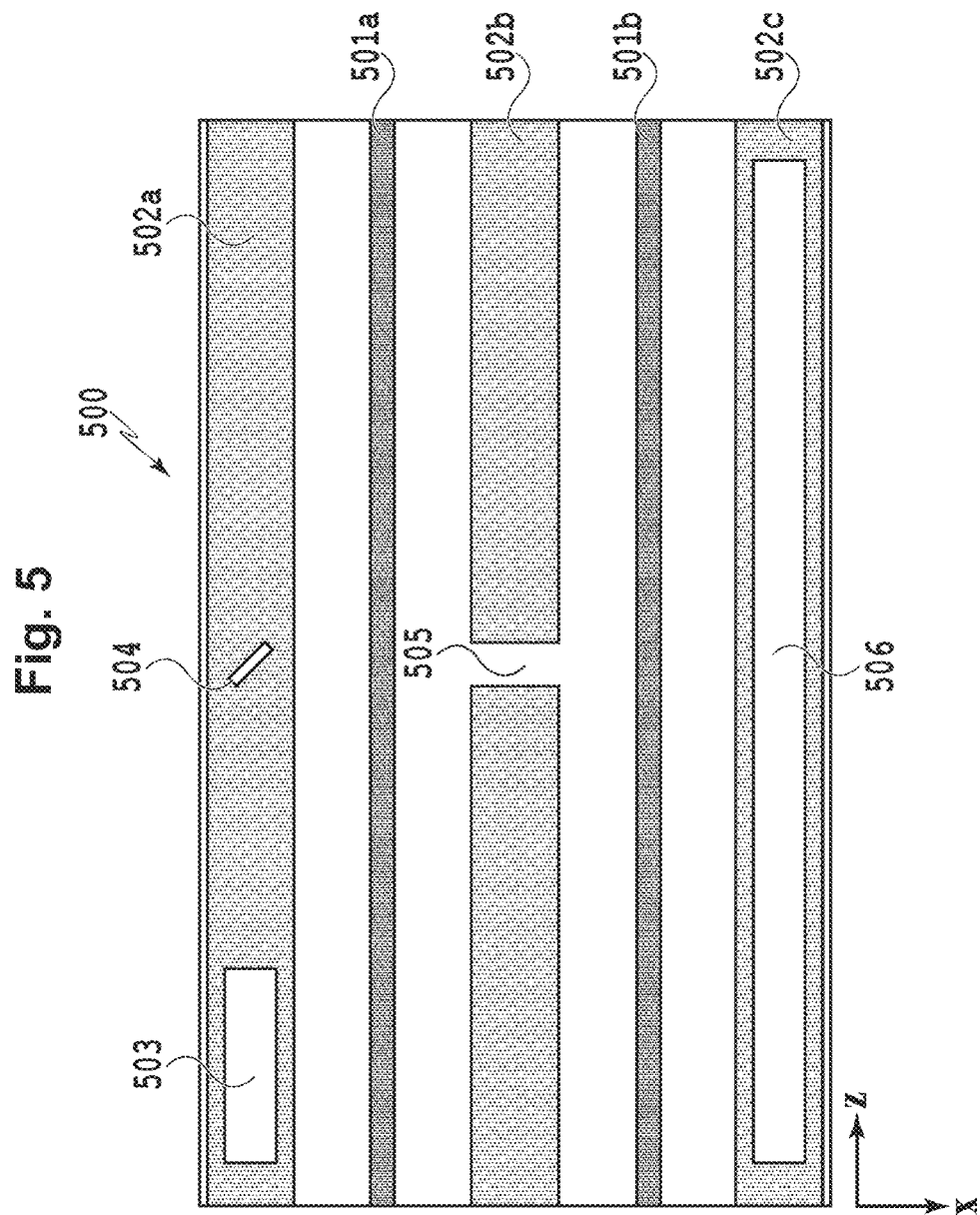
FIG. 5 is a diagram showing examples of configurations of a guided light attenuator in the wavelength conversion device according to the present invention.

FIG. 5 is a diagram showing various examples of the configuration of the guided light attenuator. FIG. 5 showing a wavelength conversion device chip 500 is a top view of the chip viewed perpendicularly to a substrate face, and the chip 500 includes nonlinear waveguides 501a and 501b used for wavelength conversion and slab waveguides 502a to 502c that are formed substantially in parallel with and spaced apart from the nonlinear waveguides. Although the slab waveguides in FIG. 5 are shown as various types of guided light attenuators, the various types of guided light attenuators are shown on one chip for the purpose of illustrating various examples of the configuration of the guided light attenuator, and the chip does not actually have to have the configuration shown in FIG. 5. The guided light attenuator may be a rectangular groove 503 formed in the slab waveguide in such a manner that the longer sides extend in the light guide direction, a groove 504 that is diagonal to the light guide direction, a slit 505 similar to that shown in FIG. 4, or a groove 506 formed in the slab waveguide to form an inner wall over the entire slab waveguide.

In short, the wavelength conversion device according to the present invention can be implemented to include a plurality of waveguides 401a and 401b formed on a substrate of a nonlinear material, a plurality of slab waveguides 402a to 402c that are arranged substantially in parallel with and spaced apart from the plurality of waveguides, and guided light attenuators (503, 504, 505 or 506) formed of a material having an index of refraction different from the index of refraction of the material forming the plurality of slab waveguides in the slab waveguides. The guided light attenuator is preferably formed as an internal region of the slab waveguide on a face of the substrate in which there is not the material forming the slab waveguide.

Although the guided light attenuators can be fabricated by etching the waveguides that are fabricated first by etching, the guided light attenuators can be most efficiently fabricated if the guided light attenuators are fabricated at the same time when the nonlinear waveguides for wavelength conversion and the slab waveguides are formed by etching. As shown in FIG. 5, the guided light attenuator can have various shapes and structures as far as the guided light attenuator can attenuate the intensity of the light guided in the slab waveguide. When the guided light attenuators are fabricated at the same time when the waveguides are fabricated, it is important to reduce the etching area. The etching area is minimized to inhibit the generation of a low-volatility sub stance.

It is also important that the shape of the guided light attenuator does not influence the pattern of the nonlinear waveguides for wavelength conversion. The fine processing by dry etching substantially depends not only on the shape of the resist for forming a desired pattern but also significantly on the pattern around the resist, and an inappropriate shape of the guided light attenuator causes uneven etching. For this reason, in order to fabricate uniform waveguides, it is desirable that the arrayed waveguides that constitute a pattern close to the waveguides are also uniform in the longitudinal direction (z-axis). Furthermore, it is desirable that the guided light attenuator is as small a structure as possible. The groove 506 formed in the slab waveguide to form an inner wall therein shown in FIG. 5 can provide uniform walls in parallel with the nonlinear waveguides 501a and 501b used for wavelength conversion and therefore is less likely to cause uneven etching of the nonlinear waveguides.

Figure 6:
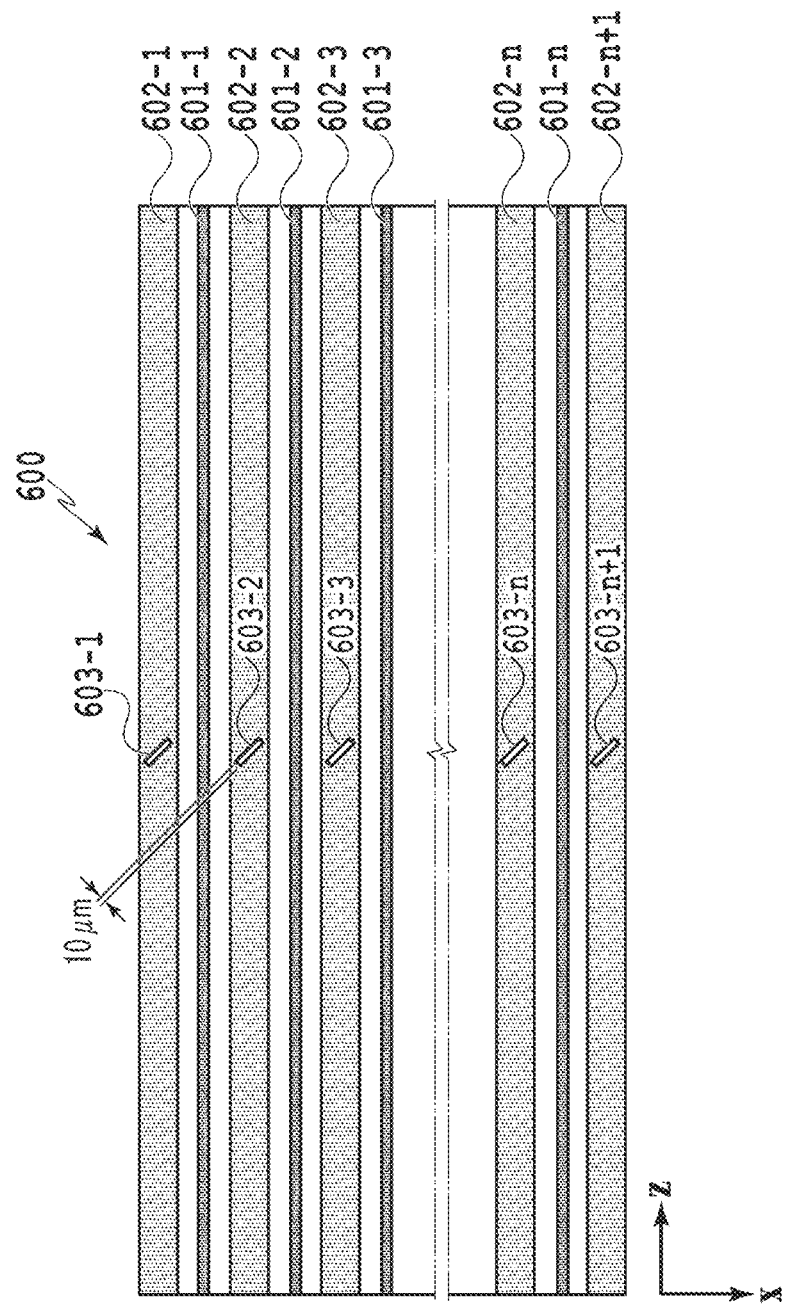
FIG. 6 is a top view showing an example of a configuration of the wavelength conversion device according to the present invention.

FIG. 6 is a top view showing an example of the configuration of the wavelength conversion device according to the present invention. FIGS. 4 and 5 are given for describing a basic arrangement of the components of the wavelength conversion device and show only two nonlinear waveguides (arrayed waveguides) used for wavelength conversion, so that the relative sizes of the components are significantly different from those of the actual device. FIG. 6 shows an arrangement of components closer to that of the actual device, although the nonlinear waveguides are still emphasized. In FIG. 6, a wavelength conversion device 600 includes n nonlinear waveguides (arrayed waveguides) 601-1 to 601-n used for wavelength conversion, and (n+1) slab waveguides 602-1 to 601-n+1 that are formed on the opposite sides of the nonlinear waveguides substantially in parallel therewith and spaced apart therefrom. The slab waveguides have guided light attenuators 603-1 to 603-n+1 in the shape of a slit diagonal to the light guide direction (z-axis direction), respectively, and can efficiently attenuate the guided light with a small size. In order to increase the attenuation of the light by the guided light attenuator, the guided light attenuator can have any shape asymmetric with respect to the light guide axis, as an alternative to the straight slit shown in FIG. 6.

Figure 7:
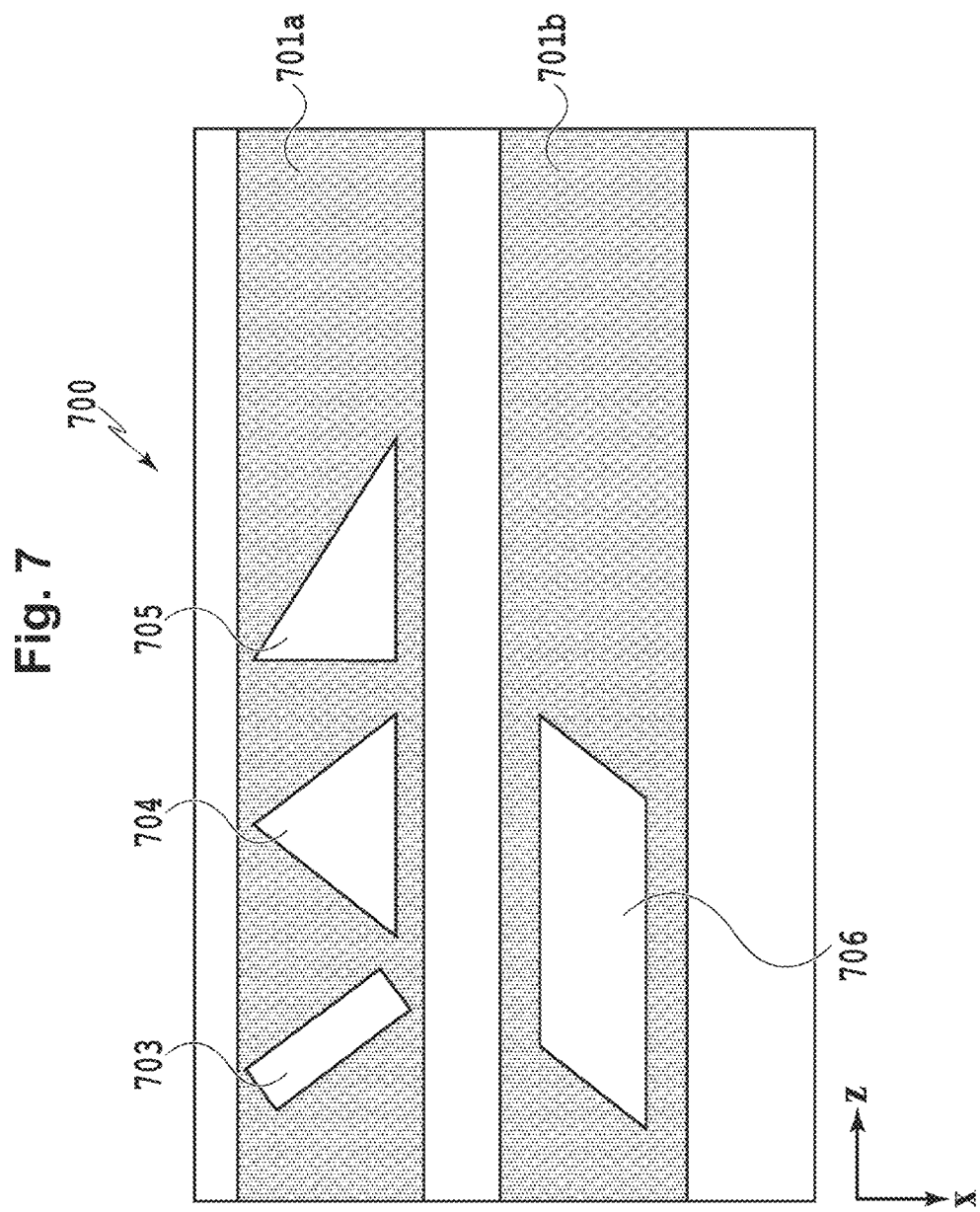
FIG. 7 is a diagram showing examples of variations of the guided light attenuator.

FIG. 7 shows various variations of the guided light attenuator of the wavelength conversion device according to the present invention. FIG. 7 shows examples of different shapes of guided light attenuators of slab waveguides 701*a* and 701*b* of a wavelength conversion device 700 altogether. In addition to a straight groove 703 diagonal to the light guide direction similar to that shown in FIG. 6, triangular grooves 704 and 705 arranged asymmetrically with respect to the light guide direction (indicated by the dotted line) and a rectangular groove 706 arranged asymmetrically with respect to the light guide direction (indicated by the dotted line) are possible. All of the guided light attenuators have an asymmetrical shape with respect to the light guide direction (z-axis) and effectively scatter test light incident on one end face of the chip.

The advantage of the configuration of the wavelength conversion device according to the present invention shown in FIGS. 4 to 7 that the optical characteristics can be efficiently evaluated without erroneous measurement is attained even when fabricating arrayed waveguides intended for other purposes than wavelength conversion that are not based on the nonlinear optics. Therefore, the material forming the device including the arrayed waveguides may be a dielectric material or semiconductor material, such as silicon, silicon dioxide, lithium niobate, indium phosphide, or polymers, or a compound of such a dielectric material or semiconductor material and an additive. Any material that is transparent to the light in the two wavelength bands used for wavelength conversion can be used.

Second Embodiment

In steps for fabricating the wavelength conversion device, arrayed waveguide having cores reduced in size to increase the wavelength conversion efficiency are fabricated. At this point, slab waveguides are formed as a result of the problems of the dry etching being solved. With the wavelength conversion device according to the first embodiment described above, in order to efficiently perform the step of selecting one waveguide having desired characteristics from a plurality of waveguides, guided light attenuators are formed in the slab waveguides. With regard to a wavelength conversion device according to a second embodiment, a configuration and a method for more efficiently performing a step of mounting the wavelength conversion device in a module after selecting a desired waveguide and then performing an adjustment and an inspection of the wavelength conversion device will be described.

As shown in FIG. 2, in order to use the wavelength conversion device in practice, a plurality of waveguides including the selected waveguide cut out as a half-finished chip needs to be packaged into a module suitable for the subsequent assembly step. The optical module is implemented as an optical functional device including not only the chip including the wavelength conversion device but also a function of an optical external connection by an optical fiber or the like and other associated functions as required. For example, the module requires pigtail fibers connected thereto for external connection, and in the module, the two end faces of the cut-out wavelength conversion device chip and the input and output optical fibers need to be optically connected. A module assembly step (Step 206) and a step of alignment between the optical fibers and the selected waveguide (Step 207) shown in FIG. 2 need to be efficiently performed.

After the characteristics of the arrayed waveguides are evaluated, the chip including the selected waveguide is packaged into a module. When packaging the cut-out chip into a module, the optical fibers and the end faces of the chip need to be optically coupled to each other via a lens in the module. With the nonlinear waveguide made of PPLN, the size of the cross section of the core exposed on the end faces is about 4 µm by 4 µm, for example, and it is more difficult to optically aligns and couples the optical fiber to the core via a lens than when achieving the optical coupling when evaluating the optical characteristics of the waveguides in order to select the desired waveguide. With the wavelength conversion device according to this embodiment, the slab waveguides, which would otherwise hinder the evaluation of the optical characteristics, are aggressively used for the optical alignment.

Figure 8:
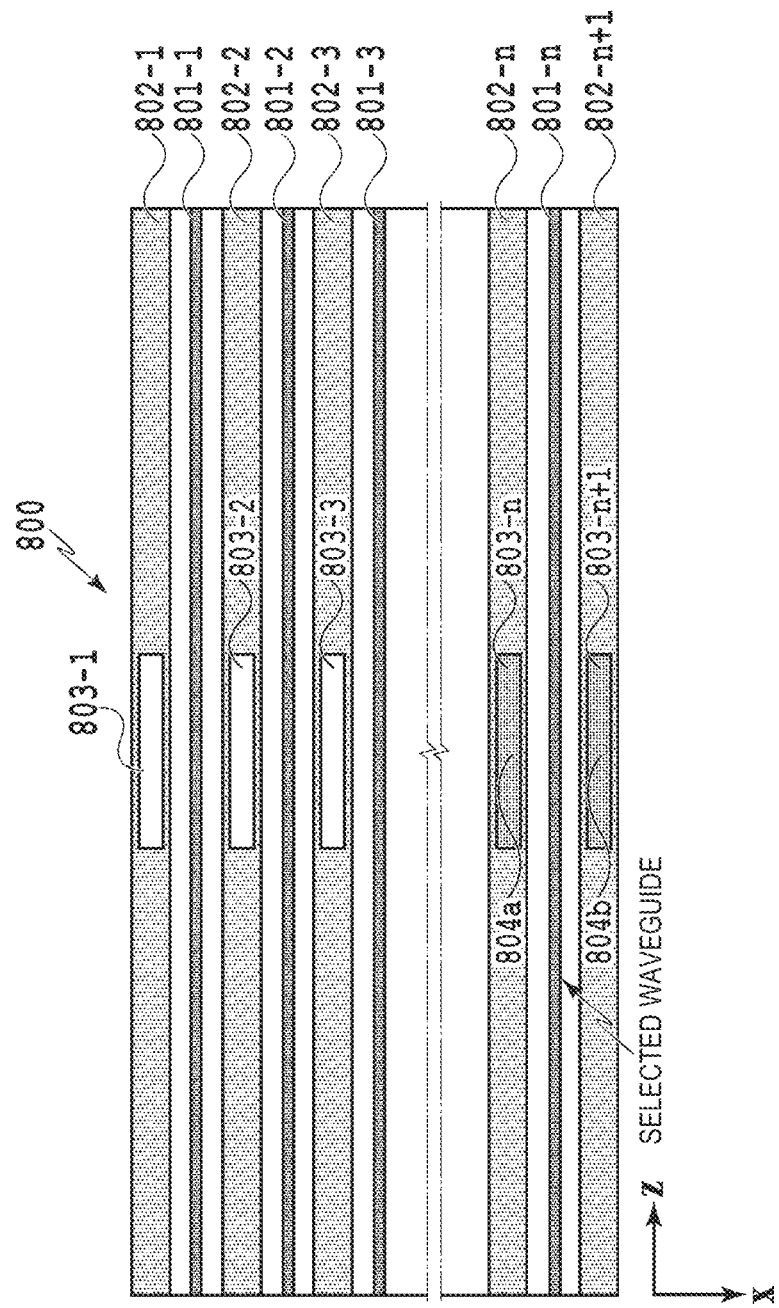
FIG. 8 is a conceptual diagram for illustrating a configuration of a wavelength conversion device according to a second embodiment of the present invention.

FIG. 8 is a conceptual diagram for illustrating a configuration of a wavelength conversion device according to the second embodiment of the present invention. FIG. 8 showing a wavelength conversion device chip 800 is a top view of the chip viewed perpendicularly to a substrate face, and the chip 800 is a chip cut out from a substrate including a plurality of waveguides formed thereon, as with the chip 500 in FIG. 5. The chip 800 includes a plurality of nonlinear waveguides 801-1 to 801-*n* used for wavelength conversion and slab waveguides 802-1 to 802-*n*+1 that are formed substantially in parallel with and spaced apart from the nonlinear waveguides. The chip 800 further includes rectangular guided light attenuators 803-1 to 803-*n*+1 formed in the slab waveguides in such a manner that the longer sides extend in the light guide direction. In FIG. 8, from the plurality of nonlinear waveguides, one waveguide 801-*n* shown at the bottom has been selected as a desired waveguide.

In this embodiment, grooves of guided light attenuators 803-*n* and 803-*n*+1 on the opposite sides of the selected waveguide 801-*n* in the light guide direction (z-axis direction) are filled with fillers 804*a* and 804*b* having a high index of refraction, respectively. The state of the grooves is equivalent to the state of the grooves filled with air whose index of refraction is 1. Therefore, after the desired waveguide is selected, if the grooves of the slab waveguides adjacent to the selected waveguide are filled with a material having a higher index of refraction than air (whose index of refraction is 1), the light attenuation by the guided light attenuators can be reduced.

In the step of selecting a desired waveguide by successively measuring the optical characteristics of the large number of waveguides in order to evaluate the optical characteristics (Step 204 in FIG. 2), there was a problem that the slab waveguides can guide the test light to a similar extent to the selected nonlinear waveguide. This problem is solved by the guided light attenuators described above. However, it occurred to the inventor that, in order to achieve a more precise and difficult optical coupling once one required waveguide has been selected, performing a rough alignment with respect to a slab waveguide, which has a larger cross section, rather than with respect to the nonlinear waveguide, which has an extremely small core cross section, would help improving the precision and efficiency of the adjustment unlike when evaluating the optical characteristics.

Figure 9:
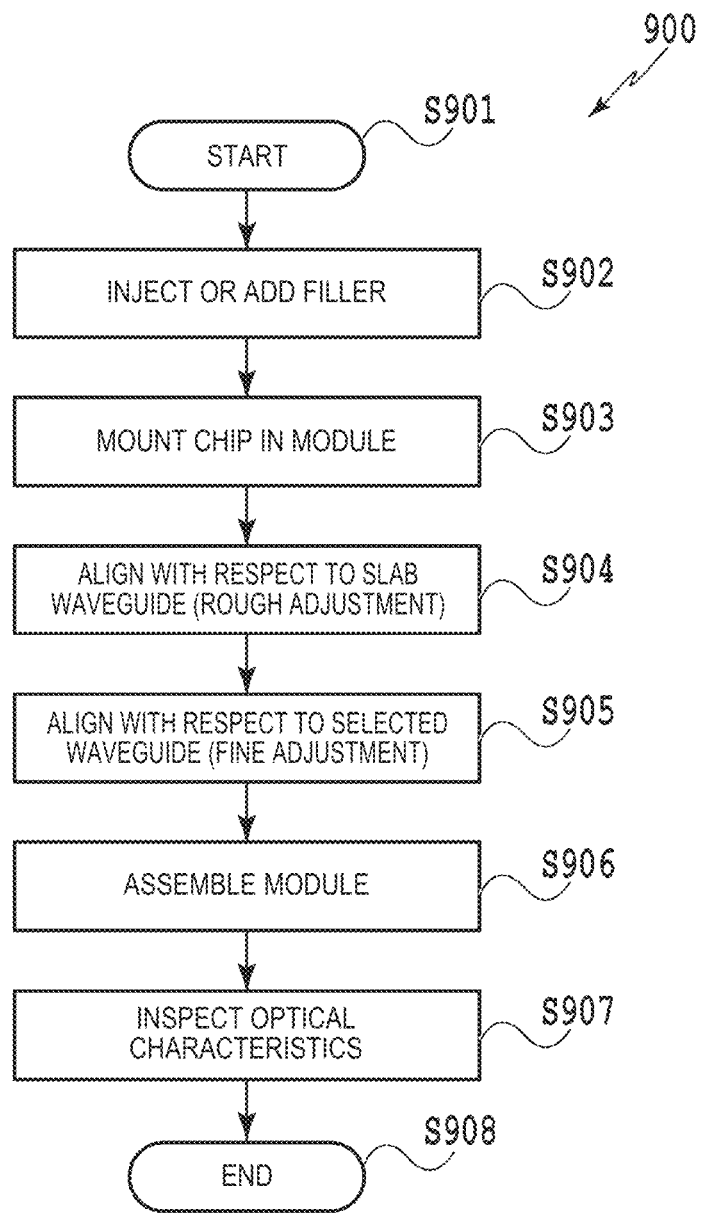
FIG. 9 is a flow diagram for illustrating a step of assembling and adjusting a wavelength conversion device module according to the present invention.

FIG. 9 is a flow diagram for illustrating steps of assembling and adjusting the wavelength conversion device module. A flow 900 in FIG. 9 corresponds to the steps 206 to 208 in the overall flow 200 of the series of fabrication steps in FIG. 2. In Step 902 in FIG. 9, a filler is injected or added to the guided light attenuators of the slab waveguides adjacent to the selected waveguide of the chip cut out in Step 205 in FIG. 2. The guided light attenuators in the form of a groove formed in the slab waveguides shown in FIG. 8 can be easily filled with the filler. If the guided light attenuator is a structure open to the outside of the slab waveguide, such as the slit 505 in FIG. 5, the filler cannot be fixed at a certain location and can flow to the selected nonlinear waveguide and cause a change of the characteristics of the waveguide. For this reason, as the guided light attenuator according to this embodiment, the groove structure formed in the slab waveguide is preferred. The filler may be a matching oil or an optical polymer and can be effectively dispensed by dropping with a micro dispenser or the like.

After the filler injected in Step 902, the chip is mounted in the module in Step 903, and the optical fiber is optically coupled to (aligned with) the waveguide cores on a chip end face via a lens in Steps 904 and 905.

In Step 904, a rough optical alignment is first performed with respect to a slab waveguide, which is reduced in capacity to attenuate light by the filler (or, in other words, has restored the level of the guided light) and has a far greater core size than the nonlinear waveguide. Referring to the top view of FIG. 8, for example, the slab waveguide has a far greater width (10 to 100 µm, for example) in the x-axis direction than the nonlinear waveguide and can be highly precisely aligned at least in the thickness direction of the substrate (y-axis direction). After that, in Step 905, an alignment can be further performed in the horizontal direction (x-axis direction) and the direction of the focal point of the lens (z-axis direction) by moving an adjustment position toward the core of the selected waveguide along the x-axis. Thus, the slab waveguide can be configured to have the guided light attenuator that attenuates the guided light when evaluating the waveguides and to transmit the light when packaging the chip into the module. The two-stage alignment in Steps 904 and 905 is not limited to the procedure described above, and various procedures and adjustment algorithms are possible. The focal point adjustment (in the z-axis direction) may be performed at the stage of the rough adjustment in Step 904, or adjustments in three directions may be repeatedly performed at the stage of the fine adjustment in Step 905.

In the example shown in FIG. 8, the grooves (guided light attenuators) 804a and 804b in the slab waveguides on the opposite sides of the selected waveguide 801-n are filled with a filler. However, of the two grooves adjacent to the selected waveguide, if at least the groove on one side of the selected waveguide is filled with a filler, the rough adjustment described above can be performed at least with respect to the one slab waveguide. Furthermore, if the groove, in which there is not the material of the slab waveguide, is used as the guided light attenuator, the groove is filled with air whose index of refraction is 1 as the material forming the guided light attenuator. Therefore, filling the groove with a filler or adding a filler to the groove leads to an increase of the index of refraction of the material of the guided light attenuator.

In short, the present invention can also be implemented as a method of fabricating a wavelength conversion device that includes a plurality of waveguides formed on a substrate of a nonlinear material and a plurality of slab waveguides that are arranged substantially in parallel with and spaced apart from the plurality of waveguides, the method including a step (202) of fabricating a guided light attenuator formed of a material having an index of refraction different from an index of refraction of a material forming the slab waveguides in the plurality of slab waveguides, a step (204) of successively measuring optical characteristics of the plurality of waveguides and selecting one waveguide having desired optical characteristics from the plurality of waveguides, and a step (902) of increasing at least the index of refraction of the material forming the guided light attenuator that is formed in the slab waveguide that is located on one side of the selected waveguide and adjacent to the selected waveguide.

As described above, a desired waveguide can be selected by evaluating the optical characteristics of all of the waveguides in the state where the light guided by the slab waveguides is sufficiently attenuated, and then, the light attenuation by the groove structure in the slab waveguides adjacent to the selected waveguide can be reduced. In this way, when packaging the chip including the selected waveguide into the module, the slab waveguide(s) that has restored the level of the guided light can be used to more easily achieve the optical adjustment (alignment) to the optical fiber and more efficiently achieve the packaging into the module. Following Steps 904 and 905, the assembly of the module is completed in Step 906, a required inspection of the optical characteristics is performed through a pigtail fiber or the like in Step 907, and then the flow 900 ends.

In the following, specific examples of the wavelength conversion device according to the present invention will be described.

Example 1

Referring to FIG. 6 again, FIG. 6 is a top view of the wavelength conversion device 600 in an example 1. The waveguides 601-1 to 601-n for wavelength conversion are made of a ferroelectric primarily made up of lithium niobate whose spontaneous polarization is periodically inverted. A lower substrate constituting a cladding portion is made of lithium tantalite having a coefficient of thermal expansion close to that of lithium niobate. The material forming the waveguides 601-1 to 601-n is a nonlinear optical material. The material forming the substrate constituting the cladding or an over-cladding may be any material that is transparent to the light in the two wavelength bands used for wavelength conversion, such as a dielectric material or semiconductor material, such as silicon, silicon dioxide, lithium niobate, indium phosphide, or polymers, or a compound of such a dielectric material or semiconductor material and an additive. The two wavelength bands can be a band around 1550 nm and a band around 775 nm in the case of optical communication, for example.

On the supposition that the wavelength conversion device 600 in FIG. 6 is applied to the field of optical communication, such as a phase sensitive amplifier or a phase conjugate converter, the wavelength conversion device 600 is designed so that the phase matching wavelength is 1.56 µm based on the core size of the waveguides and the spatial pitch of the polarization inversion. The waveguides are straight waveguides.

The substrate made of lithium tantalite has a thickness of 500 µm. The waveguides made of lithium niobate is bonded to the substrate of lithium tantalite and then thinned to a thickness of 5 µm by grinding and polishing. After that, the nonlinear waveguides and the slab waveguides are patterned by dry etching. In this step, in order that the grooves 603-1 to 603-n+1 of a width of 10 µm that are diagonal to the light guide direction are formed in the slab waveguides, patterns of the grooves are drawn in the photomask used for processing of the waveguides. The configuration according to the example 1 can be provided without increasing the steps of the procedure of fabricating the conventional wavelength conversion device.

Now, the influence of the formation of the groove structures as the guided light attenuators on the patterns of the nonlinear waveguides is evaluated. With the groove structure of a width of 10 μm according to this example, little influence on the pattern (structure) of the nonlinear waveguides for wavelength conversion is observed, and no significant change is observed in the optical characteristics as the wavelength conversion device. This shows that the wavelength conversion device according to the present invention does not deteriorate in the characteristics of the wavelength conversion capability even if the slab waveguides are provided with a guided light attenuator.

By comparing the transmittance between the slab waveguide with the guided light attenuator in this embodiment and the conventional slab waveguide without the guided light attenuator, it is confirmed that the guided light attenuator in this example attenuates the guided light by 15 dB or more. In the evaluation of the optical characteristics, the nonlinear waveguides that can be selected can be clearly distinguished from the slab waveguides. Therefore, when the optical characteristics of a plurality of waveguides are successively evaluated (in Step 204 in FIG. 2), no misalignment occurs between the cross section of the core and the fiber from the test light source and the cross section of the core and the fiber to the measurement apparatus, and the recognition of the nonlinear waveguides to be measured, the measurement of the nonlinear waveguides, and the determination and selection of a desired waveguide can be efficiently and reliably performed.

The value of 15 dB of the attenuation described above can be controlled by changing the shape, size or the like of the guided light attenuator. Therefore, the attenuation can be set according to the core size, interval or the like of the nonlinear waveguides forming the waveguide array. For example, when it is expected that an alignment error is less likely to occur when the optical characteristics of the plurality of waveguides are measured, the attenuation of light by the guided light attenuator in the initial state can be set low (that is, the level of the guided light can be set high), and the level of the guided light of the slab waveguide that is reduced in capacity to attenuate light by the filler in the second embodiment can be raised. When it is expected that an alignment error occurs when the optical characteristics are measured, the attenuation of light by the guided light attenuator in the initial state can be set high (that is, the level of the guided light can be set low) to achieve a sufficient attenuation.

Example 2

Referring to FIG. 8 again, FIG. 8 is a top view of the wavelength conversion device 800 in an example 2. The configuration in the example 2 differs from that in the example 1 shown in FIG. 6 in that, instead of the diagonal grooves 603-1 to 603-n+1 in the example 1, the guided light attenuators 803-1 to 803-n+1 in the form of a rectangular groove whose longer sides extend in the light guide direction are formed in the slab waveguides 801-1 to 801-n+1. The grooves 803-1 to 803-n+1 are fabricated to have a length of 50 μm in the light guide direction (z-axis) and a width of 20 μm in the direction (x-axis) perpendicular to the light guide direction.

The waveguides 601-1 to 601-n are made of a ferroelectric that is a nonlinear optical material and is primarily made up of lithium niobate whose spontaneous polarization is periodically inverted. A lower substrate constituting a cladding portion is made of lithium tantalite having a coefficient of thermal expansion close to that of lithium niobate. The material forming the substrate constituting the cladding or an over-cladding may be a dielectric material or semiconductor material, such as silicon, silicon dioxide, lithium niobate, indium phosphide, or polymers, or a compound of such a dielectric material or semiconductor material and an additive. Any material that is transparent to the light in the two wavelength bands used for wavelength conversion can be used.

With the wavelength conversion device 800 in FIG. 8, again, on the supposition that the wavelength conversion device 800 is applied to the field of optical communication, such as a phase sensitive amplifier or a phase conjugate converter, the wavelength conversion device 800 is designed so that the phase matching wavelength is 1.56 μm based on the core size of the waveguides and the spatial pitch of the polarization inversion. The waveguides are straight waveguides.

The substrate made of lithium tantalite has a thickness of 500 μm. The waveguides made of lithium niobate is bonded to the substrate of lithium tantalite and then thinned to a thickness of 5 μm by grinding and polishing. After that, the nonlinear waveguides and the slab waveguides are patterned by dry etching.

By comparing the transmittance between the slab waveguide with the guided light attenuator in this embodiment and the conventional slab waveguide without the guided light attenuator, it is confirmed that the guided light attenuator in this example attenuates the guided light by 20 dB or more. In this example, again, in the evaluation of the optical characteristics, the nonlinear waveguides that can be selected can be clearly distinguished from the slab waveguides. Therefore, when the optical characteristics of a plurality of waveguides are successively evaluated (in Step 204 in FIG. 2), no misalignment occurs between the cross section of the core and the fiber from the test light source and the cross section of the core and the fiber to the measurement apparatus, and the determination of the nonlinear waveguides to be measured, the measurement of the nonlinear waveguides, and the selection of a desired waveguide can be efficiently and reliably performed.

Furthermore, on the supposition that the wavelength conversion device chip 800 is packaged into the module after the desired waveguide is selected, a polymer material is dropped into the grooves 803-n and 803-n+1 in the slab waveguides on the opposite sides of the selected waveguide 801-n and cured to form the fillers 804a and 804b. After that, the intensity of the transmitted light from the slab waveguides is measured, and then the intensity of the transmitted light has increased by 8 dB compared with before the fillers are formed by dropping of the polymer material. That is, while the attenuation is 20 dB when the optical characteristics are evaluated (in Step 204 in FIG. 2), the attenuation is 12 dB when the optical fiber is aligned with the waveguides in the module (in Step 207 in FIG. 2 and Steps 904 and 905 in FIG. 9). Since the intensity of the transmitted light from the slab waveguides adjacent to the selected wavelength has increased, the optical fiber can be more easily aligned with the chip end face via a lens by performing a rough adjustment with respect to the slab waveguides (Step 904) when the chip is packaged into the module.

In this example, when the optical fiber is aligned with the selected waveguide in the module, the intensity of the transmitted light from the slab waveguide does not need to be totally restored to the level of the slab waveguide without the guided light attenuator. That is, the intensity of the transmitted light from the slab waveguide is sufficient if the intensity allows the rough adjustment before the alignment of the selected nonlinear waveguide. Furthermore, in this example, based on the difference in intensity of the transmitted light between the slab waveguides that are adjacent to the selected waveguide and are reduced in capacity to attenuate light by the filler and the slab waveguides that are not adjacent to the selected waveguide, the location of the selected waveguide on the chip end face (along the x-axis) can be easily determined. Furthermore, when the alignment in the module is performed, the selected waveguide is less likely to be missed owing to the difference in level of the transmitted light between the slab waveguides. This prevents an error in the steps of assembly and adjustment of the module and improves the series of fabrication steps shown in FIGS. 2 and 9 in terms of quality and cost.

Example 3

Figure 10:
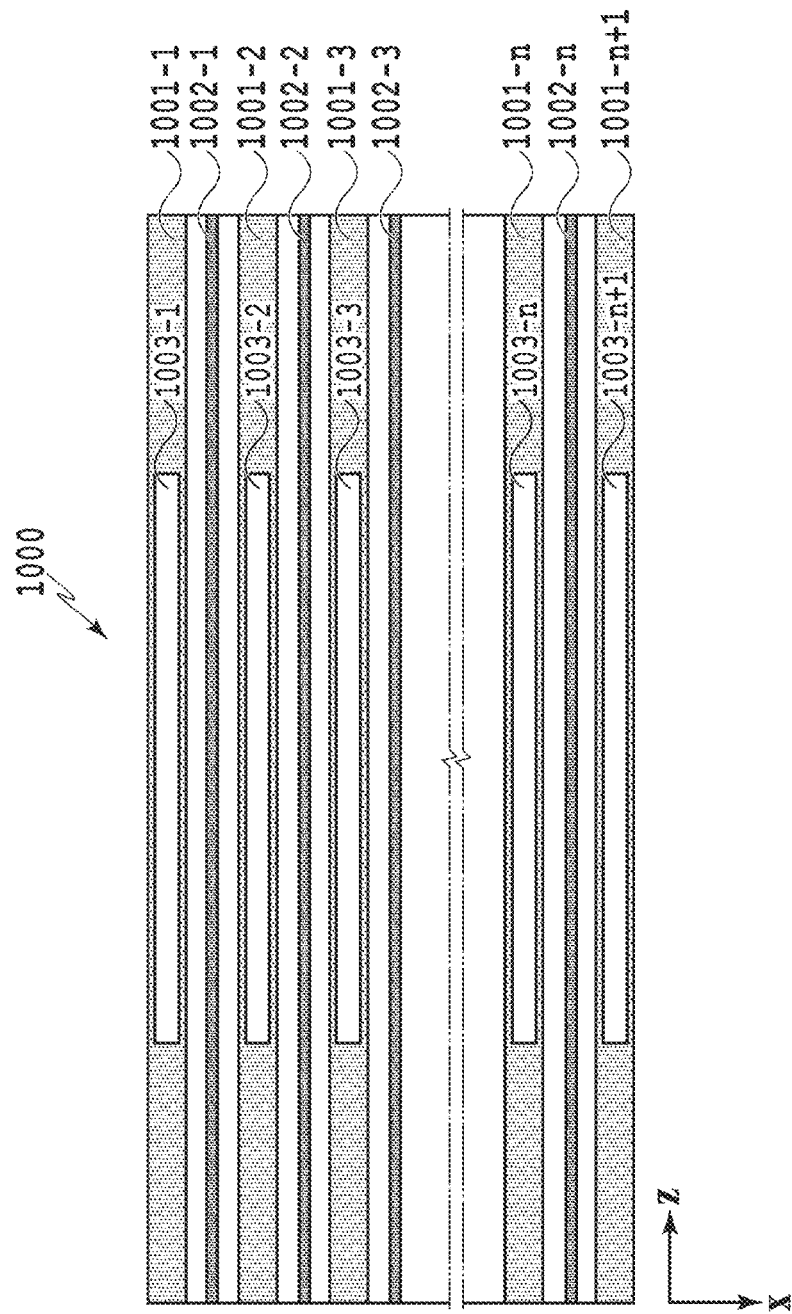
FIG. 10 is a top view showing a configuration of a wavelength conversion device in an example 3 of the present invention.

FIG. 10 is a top view of a wavelength conversion device 1000 in an example 3 of the present invention. The configuration in the example 3 differs from those in the examples 1 and 2 shown in FIGS. 6 and 8 in that, as the guided light attenuators, grooves 1003-1 to **1003-*n*+1 are formed in the slab waveguides 1001-1 to 1001-*n*+1 to form inner walls over the whole of the respective slab waveguides. The grooves 1003-1 to 1003-*n*+1** are fabricated to have a length of 2 cm in the light guide direction (z-axis) and a width of 20 μm in the direction (x-axis) perpendicular to the light guide direction. The materials forming these components are the same as those described in the examples 1 and 2 and therefore will not be further described.

With the wavelength conversion device 1000 in FIG. 10, again, on the supposition that the wavelength conversion device 1000 is applied to the field of optical communication, such as a phase sensitive amplifier or a phase conjugate converter, the wavelength conversion device 1000 is designed so that the phase matching wavelength is 1.56 μm based on the core size of the waveguides and the spatial pitch of the polarization inversion. The waveguides are straight waveguides.

By comparing the transmittance between the slab waveguide with the guided light attenuator in this embodiment and the conventional slab waveguide without the guided light attenuator, it is confirmed that the guided light attenuator in this example attenuates the guided light by 40 dB or more. The guided light attenuators allow the nonlinear waveguides that can be selected to be clearly distinguished from the slab waveguides in the evaluation of the optical characteristics.

Furthermore, on the supposition that the wavelength conversion device chip 1000 is packaged into the module after the desired waveguide is selected, a lithium niobate device block having projections capable of being fitted into the grooves in the slab waveguides on the opposite sides of the selected nonlinear waveguide is inserted.

Figure 11:
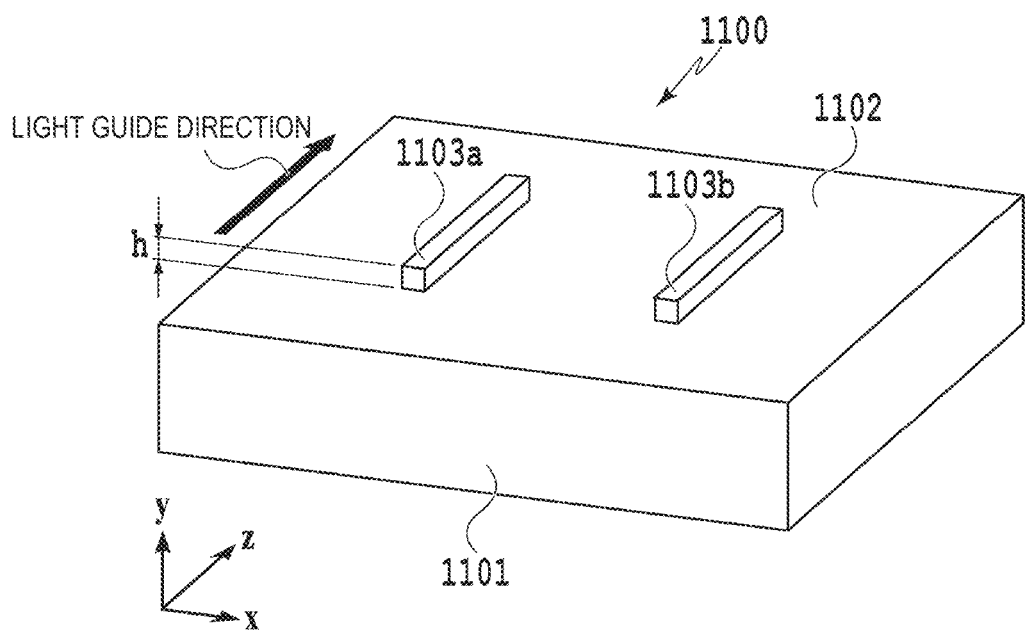
FIG. 11 is a diagram showing a filler block for the wavelength conversion device in the example 3 of the present invention.

FIG. 11 is a diagram showing a configuration of a filler block that changes the attenuation by the guided light attenuator of the wavelength conversion device in the example 3. A filler block 1100 includes a substrate 1101 of a lithium niobate device and two projections **1103*a* and 1103*b* having the shape of a quadrangular prism formed on a face of the substrate. The projections 1103*a* and 1103*b* are fabricated by photolithography as with the waveguides. The filler block 1100 shown in FIG. 11 is turned upside down so that the face thereof on which the projections are formed faces the face of the wavelength conversion device chip in FIG. 10 on which the waveguides are formed and the two projections can be fitted into the grooves on the opposite sides of the selected waveguide. Therefore, a height h of the projections has to be greater than the depth of the grooves 1003-1 to 1003-*n*+1 serving as the guided light attenuators. This is intended to prevent an etched-back face 1102, which is the top face of the substrate 1101 after being etched in FIG. 11, from coming into contact with the nonlinear waveguides in FIG. 10**, which are ridge waveguides.

After the projections of the filler block 1100 shown in FIG. 11 are inserted into the grooves of the slab waveguides adjacent to the selected waveguide shown in FIG. 10, the intensity of the transmitted light from the slab waveguides is measured, and then the intensity of the transmitted light has increased by 35 dB compared with before the fillers are inserted. Since the intensity of the transmitted light from the slab waveguides adjacent to the selected waveguide has increased, the alignment can be easily made when packaging the chip into the module. In this example, again, when the optical fiber is aligned with the selected waveguide via a lens, the intensity of the transmitted light from the slab waveguide does not need to be totally restored to the level of the slab waveguide without the guided light attenuator. The intensity of the transmitted light from the slab waveguide is sufficient if the intensity allows the rough adjustment with respect to the selected nonlinear waveguide before the alignment of the selected nonlinear waveguide.

With the wavelength conversion devices in the second embodiment and the third embodiment, the closer to the index of refraction of the material of the slab waveguide the index of refraction of the filler inserted into the groove of the guided light attenuator, the more greatly the intensity of the transmitted light is restored when the filler is inserted. Although the slab waveguide and the filler are both LN in this example, the filler can also be lithium tantalite, which has a coefficient of thermal expansion closer to that of LN. Even a material having a coefficient of thermal expansion significantly different from that of LN, such as a dielectric material or semiconductor material, such as silicon, silicon dioxide, lithium niobate, indium phosphide, or polymers, or a compound of such a dielectric material or semiconductor material and an additive, can also be used as the filler under an environmental condition that the temperature of the wavelength conversion device can be kept constant. Any material that is transparent to the light in the two wavelength bands used for wavelength conversion can be used.

In this example, again, based on the difference in intensity of the transmitted light between the slab waveguides that are adjacent to the selected waveguide and are reduced in capacity to attenuate light by the filler and the slab waveguides that are not adjacent to the selected waveguide, the location of the selected waveguide on the chip end face (along the x-axis) can be easily determined. When the optical fiber is aligned with the cross section of the core via a lens in the module, the problem of selecting a wrong waveguide does not occur. Errors in the steps of assembly and adjustment of the module including the wavelength conversion device are prevented, steps in the series of fabrication steps shown in FIGS. 2 and 9 are prevented from being unnecessarily repeated, and the wavelength conversion device is improved in terms of quality and fabrication cost.

In the examples described above, the wavelength bands around 1550 nm and 775 nm have been described as an example on the supposition that the wavelength conversion device is applied to the optical communication. However, the wavelength conversion device can be used in other fields, such as the optical quantum information processing, and can be used with various other wavelength bands.

In the embodiments and examples described above, the module of the wavelength conversion device has been described as a fiber-pigtailed module that incorporates a single cut-out chip and has only the wavelength conversion device function. However, of course, a module including a plurality of wavelength conversion devices forming an apparatus, such as a photo-sensitive amplifier or an optical transmitter, provides the same effects. Since such an apparatus uses a plurality of wavelength conversion device, a plurality of chips needs to be mounted in the module. For achieving the optical coupling to the chips in the module, the wavelength conversion device according to the second embodiment can be used. Therefore, the apparatus including the wavelength conversion device according to the second embodiment of the present invention is also an aspect of the present invention.

The basic concept of the present invention is not limited to wavelength conversion devices based on the nonlinear optics, but can also be applied to cases of selecting one or more waveguides from among a plurality of waveguides in a situation where a plurality of incidental waveguides having the same optical characteristics or functions as the plurality of waveguides are formed when the plurality of waveguides are fabricated.

As described above in detail, according to the present invention, the wavelength conversion device can be efficiently manufactured at low cost.

INDUSTRIAL APPLICABILITY

The present invention can generally be applied to a communication system. For example, the present invention can be applied to an optical communication system or an optical measurement system.

REFERENCE SIGNS LIST 101a, 101b, 302-1 to 302-n, 401a, 401b, 501a, 501b, 601-1 to 601-n, 801-1 to 801-n, 1001-1 to 1001-n waveguide
102a to 102c, 402a to 402c, 502a to 502c, 602-1 to 602n+1, 701a, 701b, 802-1 to 802-n+1, 1002-1 to 1002-n+1 slab waveguide
300 wafer
301 chip
301-1 to 301-4 area
303 test light source
306 measurement instrument
400, 500, 600, 800, 1000 wavelength conversion device
503, 504, 505, 506 groove
603-1 to 603-n+1, 703 to 706, 803-1 to 803-n+1, 1003-1 to 1003-n+1 guided light attenuator
1100 filler block
1103a, 1103b projection

The invention claimed is:

1. A wavelength conversion device, comprising:
a plurality of waveguides formed on a substrate of a nonlinear material;
a plurality of slab waveguides that are arranged substantially in parallel with and spaced apart from the plurality of waveguides; and
guided light attenuators formed of a material having an index of refraction different from an index of refraction of a material forming the slab waveguide in the plurality of slab waveguides,
wherein the guided light attenuator is a groove formed in the slab waveguide as an internal region thereof by removing the material forming the slab waveguide, and of slab waveguides adjacent to one of the plurality of waveguides, at least the groove formed in the slab waveguide on one side of the one waveguide is completely filled with a solid material having an index of refraction greater than 1.

2. The wavelength conversion device according to claim 1, wherein the guided light attenuator is formed as an internal region of the slab waveguide on a face of the substrate in which there is not the material forming the slab waveguide.

3. The wavelength conversion device according to claim 1, wherein on a face of the substrate, the guided light attenuator has a shape that is asymmetrical with respect to a light guide direction in the plurality of slab waveguides.

4. The wavelength conversion device according to claim 1, wherein the plurality of waveguides and the plurality of slab waveguides are straight waveguides, and a configuration parameter that determines a size of a core of each of the plurality of waveguides gradually varies between the plurality of waveguides.

5. The wavelength conversion device according to claim 1, wherein the plurality of waveguides is made of $LiNbO_3$ or a material containing $LiNbO_3$ and at least one of the following additives: Mg, Zn, Sc or In.

6. A method of fabricating a wavelength conversion device that includes a plurality of waveguides formed on a substrate of a nonlinear material and a plurality of slab waveguides that are arranged substantially in parallel with and spaced apart from the plurality of waveguides, the method comprising:
a step of fabricating a guided light attenuator formed of a material having an index of refraction different from an index of refraction of a material forming the slab waveguides in the plurality of slab waveguides;
a step of successively measuring an optical characteristic of the plurality of waveguides and selecting one waveguide having a desired optical characteristic from the plurality of waveguides; and
a step of increasing at least the index of refraction of the material forming the guided light attenuator that is formed in the slab waveguide that is located on one side of the selected waveguide and adjacent to the selected waveguide.

7. The method according to claim 6, wherein the guided light attenuator is a groove formed in the slab waveguide as an internal region thereof by removing the material forming the slab waveguide, and
the step of increasing the index of refraction of the material forming the guided light attenuator comprises:
filling the groove with a material having an index of refraction greater than 1.

8. The wavelength conversion device according to claim 2, wherein on a face of the substrate, the guided light attenuator has a shape that is asymmetrical with respect to a light guide direction in the plurality of slab waveguides.

9. The wavelength conversion device according to claim 2, wherein the plurality of waveguides and the plurality of slab waveguides are straight waveguides, and a configuration parameter that determines a size of a core of each of the plurality of waveguides gradually varies between the plurality of waveguides.

10. The wavelength conversion device according to claim 3, wherein the plurality of waveguides and the plurality of slab waveguides are straight waveguides, and a configuration parameter that determines a size of a core of each of the plurality of waveguides gradually varies between the plurality of waveguides.

11. The wavelength conversion device according to claim 2, wherein the plurality of waveguides is made of $LiNbO_3$ or a material containing $LiNbO_3$ and at least one of the following additives: Mg, Zn, Sc or In.

12. The wavelength conversion device according to claim 3, wherein the plurality of waveguides is made of $LiNbO_3$ or a material containing $LiNbO_3$ and at least one of the following additives: Mg, Zn, Sc or In.

13. The wavelength conversion device according to claim 4, wherein the plurality of waveguides is made of $LiNbO_3$ or a material containing $LiNbO_3$ and at least one of the following additives: Mg, Zn, Sc or In.

14. A wavelength conversion device, comprising:
a plurality of waveguides formed on a substrate of a nonlinear material;
a plurality of slab waveguides that are arranged substantially in parallel with and spaced apart from the plurality of waveguides; and
guided light attenuators formed of a material having an index of refraction different from an index of refraction of a material forming the slab waveguide in the plurality of slab waveguides,
wherein the guided light attenuator is a groove formed in the slab waveguide as an internal region thereof by removing the material forming the slab waveguide, and of slab waveguides adjacent to one of the plurality of waveguides, at least the groove formed in the slab waveguide on one side of the one waveguide is filled with a material having an index of refraction greater than 1, and
wherein on a face of the substrate, the guided light attenuator has a shape that is asymmetrical with respect to a light guide direction in the plurality of slab waveguides.

* * * * *